United States Patent
Alqarni et al.

(10) Patent No.: US 10,281,889 B2
(45) Date of Patent: May 7, 2019

(54) SYSTEM AND METHOD TO GUIDE A CROWD

(71) Applicant: Imam Abdulrahman Bin Faisal University, Dammam (SA)

(72) Inventors: Alanoud Mohammed Alqarni, Dammam (SA); Bayan Saad Alharthi, Dammam (SA); Hanan Saad Alharthi, Dammam (SA); Alya Mushaykhis Algarni, Dammam (SA); Shatha Dhafer Algarni, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/830,449

(22) Filed: Dec. 4, 2017

(65) Prior Publication Data

US 2018/0157227 A1 Jun. 7, 2018

Related U.S. Application Data

(60) Provisional application No. 62/429,421, filed on Dec. 2, 2016.

(51) Int. Cl.
*G05B 15/02* (2006.01)
*G06Q 30/00* (2012.01)

(52) U.S. Cl.
CPC ............. *G05B 15/02* (2013.01); *G06Q 30/01* (2013.01)

(58) Field of Classification Search
USPC ....................................... 700/275
See application file for complete search history.

(56) References Cited

U.S. PATENT DOCUMENTS

2013/0268230 A1   10/2013   Deeks

FOREIGN PATENT DOCUMENTS

| CN | 101795395 B | 7/2012 |
|---|---|---|
| EP | 2 147 356 B1 | 5/2013 |
| WO | 2014/174737 A1 | 10/2014 |
| WO | 2015/106808 A1 | 7/2015 |

*Primary Examiner* — Mohammad Ali
*Assistant Examiner* — Joshua T Sanders
(74) *Attorney, Agent, or Firm* — Oblon, McClelland, Maier & Neustadt, L.L.P.

(57) ABSTRACT

A control system to guide a crowd, including a detection module to provide stepping signals from the crowd via a plurality of detectors placed on a walking surface of the control system, a sorting module to provide a favorable path for the crowd, the sorting module including a plurality of movable walls, each movable wall of the plurality of movable walls being independently articulated from an open position to a closed position to provide the favorable path, and an electrical control module configured to convert the stepping signals into statistics, determine the favorable path based on the statistics, and articulate the plurality of movable walls to force the crowd through the favorable path.

20 Claims, 9 Drawing Sheets

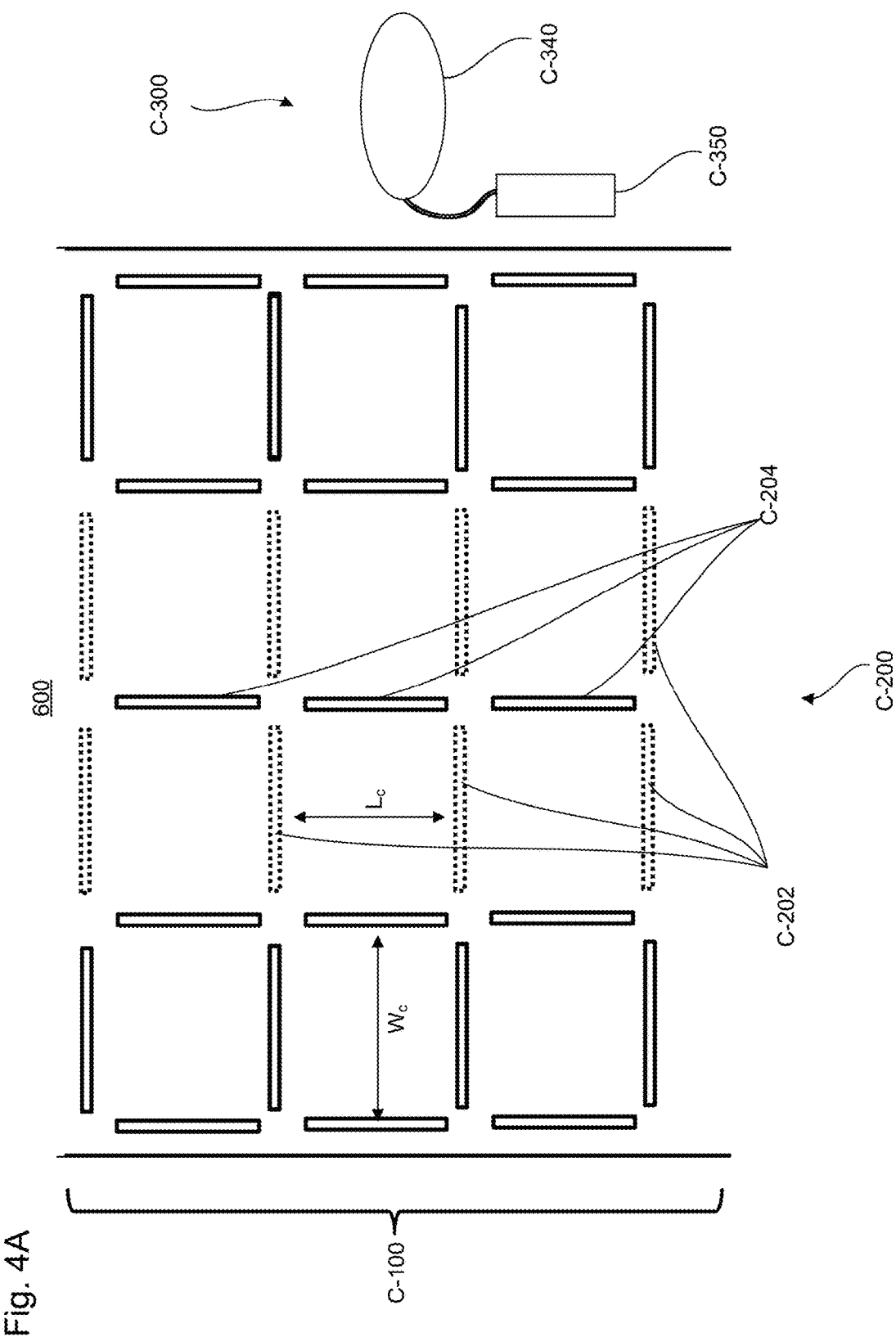

SYSTEM AND METHOD TO GUIDE A CROWD

CROSS-REFERENCE TO RELATED APPLICATIONS

This application claims priority to U.S. Application No. 62/429,421 entitled "System and Method to Guide a Crowd" and filed Dec. 2, 2016, the contents of which are incorporated by reference in their entireties.

BACKGROUND

Field of the Disclosure

The present disclosure relates to crowd guidance and management.

Description of the Related Art

Large scale attraction sites such as tourist/religious sights, theme parks, sporting events, exhibition centers, or entertainment facilities can attract a large crowd of individuals.

Often, this large crowd has to be channeled or funneled through specific local points or narrow passages such as gates, ticketing booths, or checkpoints.

The funneling through these specific local points or narrow passages can generate important problematic and unsafe crowd behaviors such as agglomerations, compressive asphyxia, conflicts, and psychological pressures.

Apparatuses to better channel and guide the large crowds such as fences, barriers, or turnstiles, have been proposed.

Though such apparatuses have been considerably used, they have numerous limitations. For example, these conventional apparatuses for controlling the crowd can act as rigid and passive structures that do not take into account the characteristic of the crowd and may become ineffective as the crowd evolves.

Thus, an apparatus and method to manage a crowd solving the aforementioned problem of rigidity and passivity is desired.

SUMMARY

Accordingly, the object of the present disclosure is to provide a control system and a method to guide a crowd which overcomes the above-mentioned limitations.

The control system and method to guide a crowd of the present disclosure solves the problems of rigidity and passivity by analyzing, guiding and forcing the crowd through adaptive paths. More precisely, the adaptive paths are generated via a plurality of movable walls that are articulated to provide a favorable path for the crowd based on statistics extracted from the crowd.

In one non-limiting illustrative example, a control system to guide a crowd is presented. The control system to guide the crowd includes a detection module to provide stepping signals from the crowd via a plurality of detectors placed on a walking surface of the control system, a sorting module to provide a favorable path for the crowd, the sorting module including a plurality of movable walls, each movable wall of the plurality of movable walls being independently articulated from an open position to a closed position to provide the favorable path, wherein in the open position the movable wall protrudes from the walking surface and in the closed position the movable wall is retracted in the walking surface, a directing module to indicate to the crowd the favorable path, the directing module including a plurality of projectors to project visual indications to indicate the favorable path, and a plurality of speakers to diffuse audio indications to indicate the favorable path, and an electrical control module configured to convert the stepping signals into statistics, determine the favorable path based on the statistics, actuate the plurality of projectors to project the visual indications, actuate the plurality of speakers to diffuse the audio indications, and articulate the plurality of movable walls to force the crowd through the favorable path.

In another non-limiting illustrative example, a control system to guide a crowd is presented. The control system to guide the crowd includes a detection module to provide stepping signals from the crowd via a plurality of detectors placed on a walking surface of the control system, a sorting module to provide a favorable path for the crowd, the sorting module including a plurality of movable walls, each movable wall of the plurality of movable walls being independently articulated from an open position to a closed position to provide the favorable path, wherein in the open position the movable wall protrudes from the walking surface and in the closed position the movable wall is retracted in the walking surface, and an electrical control module configured to convert the stepping signals into statistics, determine the favorable path based on the statistics, and articulate the plurality of movable walls to force the crowd through the favorable path.

In another non-limiting illustrative example, a method to guide a crowd is presented. The method to guide the crowd includes providing a detection module with a plurality of detectors placed on a walking surface, providing a sorting module with a plurality of movable walls, each movable wall of the plurality of movable walls being independently articulated from an open position to a closed position, wherein in the open position the movable wall protrudes from the walking surface, and in the closed position the movable wall is retracted in the walking surface, providing a directing module with a plurality of projectors and a plurality of speakers, extracting, via the plurality of detectors, stepping signals from the crowd; converting, via software instruction performed on an electrical control module, the stepping signals into statistics, determining, via software instruction performed on the electrical control module, a favorable path for the crowd based on the statistics, actuating, via software instructions performed on the electrical control module, the plurality of projectors to project visual indications for the favorable path, actuating, via software instructions performed on the electrical control module, the plurality of speakers to diffuse audio indications for the favorable path, articulating, via software instructions performed on the electrical control module, the plurality of movable walls to guide the crowd through the favorable path.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4A is a top view of a sorting module of the control system providing a straight forward path, according to certain aspects of the disclosure;

DETAILED DESCRIPTION

Figure 1A:
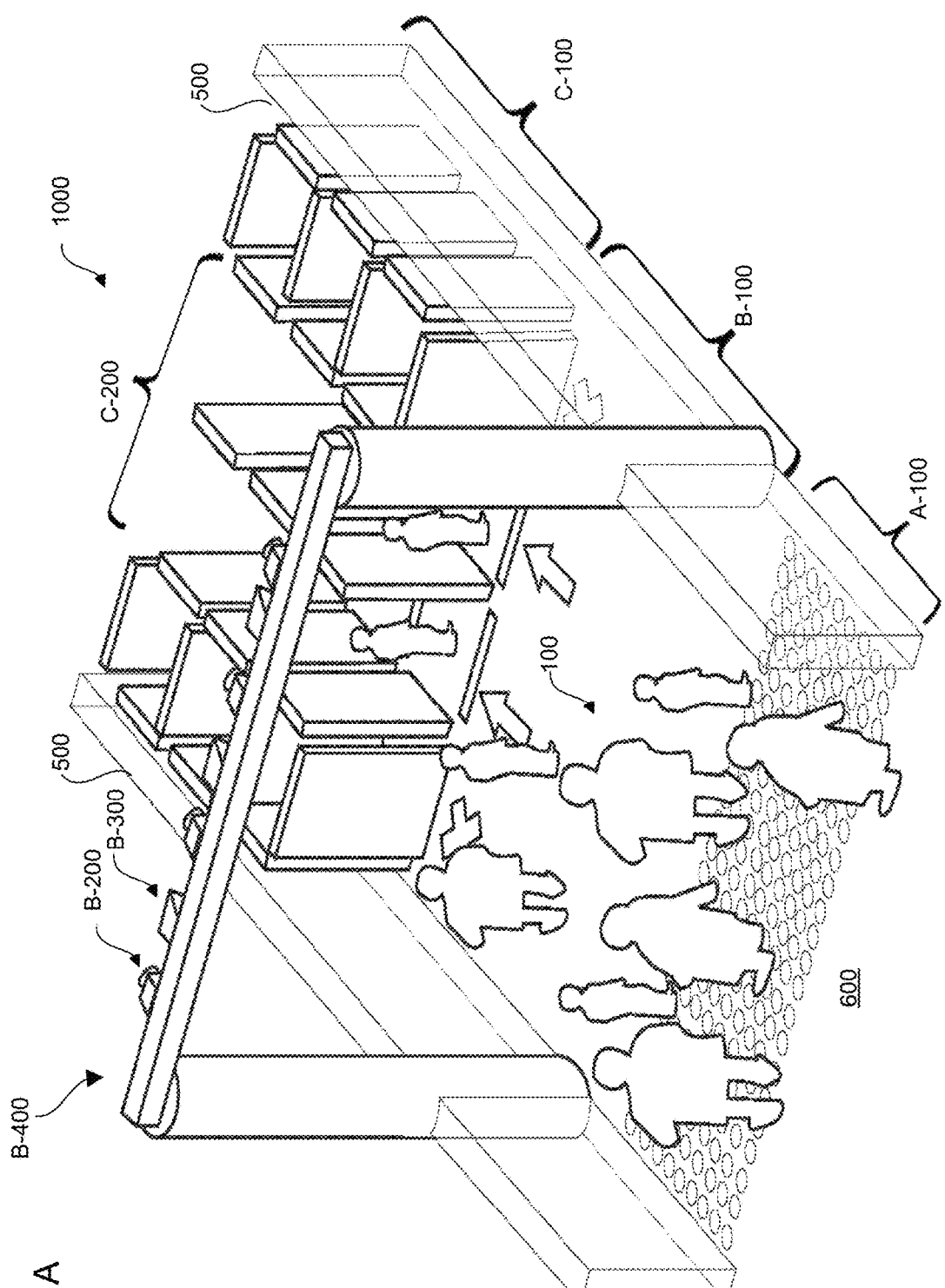
FIG. 1A is a perspective view of a control system to guide a crowd, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
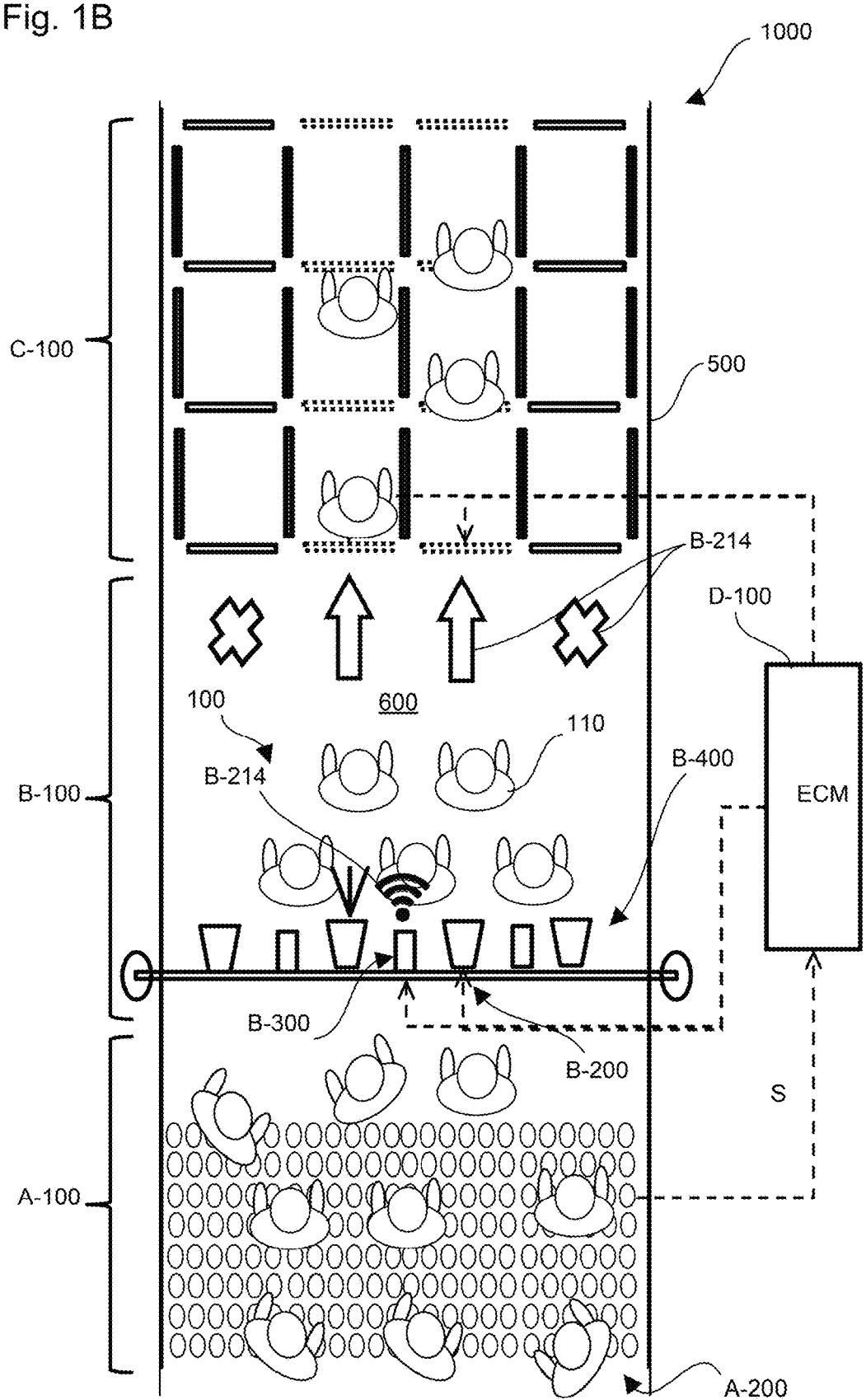
FIG. 1B is a top view of the control system to guide the crowd, according to certain aspects of the disclosure.

FIGS. 1A-1B are a perspective view and a top view of a control system 1000 to guide a crowd 100, according to certain aspects of the disclosure.

The control system 1000 is configured to let the crowd 100 walk between a pair of barriers 500 and to actively guide and manage the crowd 100 through dynamically adaptive paths.

The control system 1000 can include a detection module A-100, a sorting module C-100, a directing module B-100 located between the detection module A-100 and the sorting module C-100, and an electrical control module D-100 that controls and actuates different elements of the detection module A-100, the sorting module C-100, and the directing module B-100.

The detection module A-100 is configured to provide statistics P from the crowd 100 via detection means A-200, the electrical control module D-100 is configured to determine a favorable path for the crowd 100 based on the statistics P, the directing module B-100 is configured to indicate to the crowd 100 the favorable path via visual means B-200 and audio means B-300, and the sorting module C-100 is configured to force the crowd 100 to pass through the favorable path via a plurality of movable walls C-200.

Figure 2:
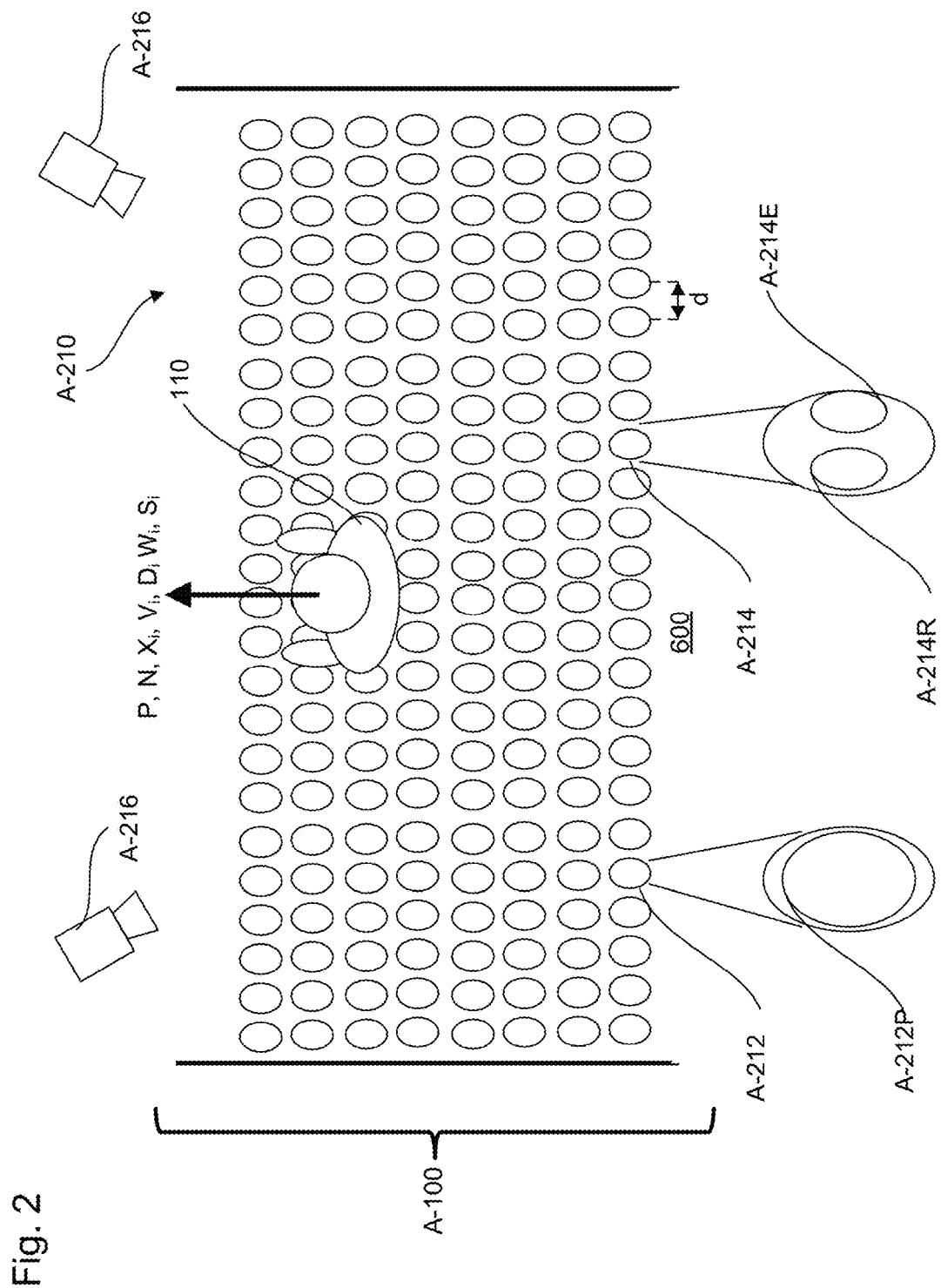
FIG. 2 is a top view of detection module of the control system, according to certain aspects of the disclosure.

FIG. 2 is a top view of the detection module A-100 of the control system 1000, according to certain aspects of the disclosure.

The detection means A-200 of the detection module A-100 can include a plurality of detectors A-210 inserted on a walking surface 600 of the control system 1000. Each detector of the plurality of detectors A-210 is configured to provide stepping signals S corresponding to one or more steps performed by subjects 110 of the crowd 100 across the walking surface 600. The plurality of detectors A-210 is such that the stepping signals S provided can be converted into statistics P via software instructions performed by the electrical control module D-100, wherein the statistics P can be a number N of the subjects 110 in the crowd 100, a position $X_i$ of each subject 110 in the crowd 100, a moving speed $V_i$ for each subject 110 of the crowd 100, a moving direction $D_i$ for each subject 110 in the crowd 100, a weight $W_i$ of each subject 110 in the crowd 100, a size $S_i$ of each subject 110 in the crowd 100, or any other statistical measurements.

In some embodiments, each detector of the plurality of detectors A-210 can include a pressure sensor A-212 configured to provide the stepping signals S when a subject 110 of the crowd 100 steps on a pressure surface A-212P of the pressure sensor A-212. For example, the pressure sensor A-212 can be a resistance switch, a piezo touch switch, or any other pressure detection apparatus known by a person having ordinary skill in the art that provides step detection.

In other embodiments, each detector of the plurality of detectors A-210 can include an optic sensor A-214 configured to provide the stepping signals S when the subject 110 of the crowd 100 is substantially close to the optic sensor A-214. For example, the optic sensor A-214 may include at least one light-emitting diode (LED) A-214E and at least one infrared (IR) receiver A-214R, wherein the at least one LED A-214E emits light beams that are reflected on the subject 110 and received back by the at least one IR receiver A-214R.

The plurality of detectors A-210 can have a geometrical arrangement and a distribution to accurately capture the statistics P of the crowd 100. The plurality of detectors A-210 can be arranged in matrix and be located with a predetermined distance d away from one another. The predetermined distance d can depend on a plurality of factors such as, an average walking speed of the subjects 110 of the crowd 100 or an average step size of the subjects 110 of the crowd 100. For example, the predetermined distance d can be between 0.1 cm and 25 cm, and particularly between 1 cm and 10 cm.

Alternatively, the plurality of detectors A-210 can include a plurality of cameras A-216 that capture videos of the crowd 100. The videos captured by the plurality of cameras A-216 can be analyzed via software instructions performed by the electrical control module D-100 to extract the statistics P of the crowd 100. The software instructions performed by the electrical control module D-100 to extract the statistics P can rely on image analysis tools such as shape recognition, object tracking, object extraction, image filtering, image scaling or the like.

Figure 3:
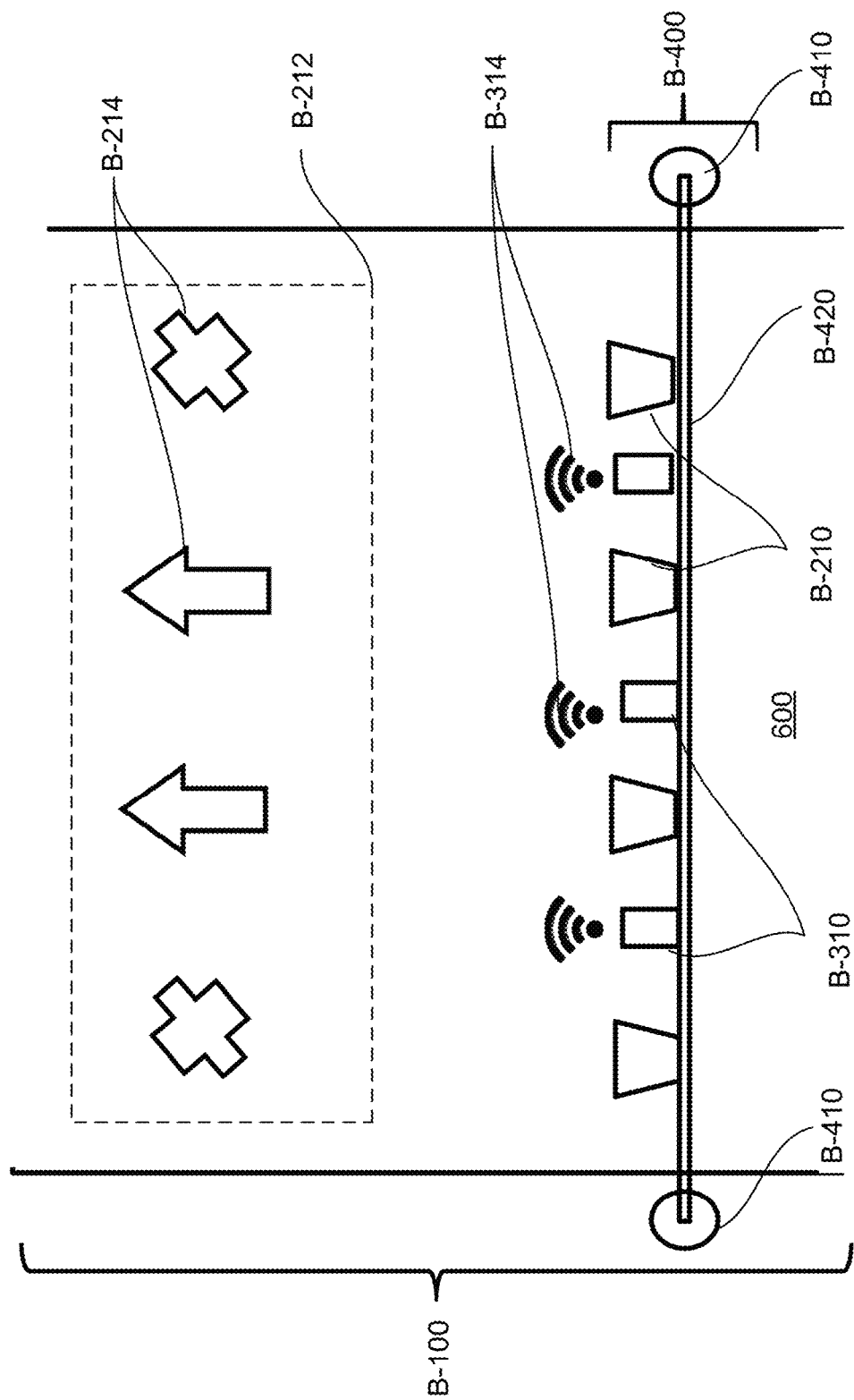
FIG. 3 is a top view of a directing module of the control system, according to certain aspects of the disclosure.

FIG. 3 is a top view of a directing module B-100 of the control system 1000, according to certain aspects of the disclosure.

The directing module B-100 is configured to direct the crowd 100 from the detection module A-100 to the sorting module C-100, and particularly to point out the favorable path that has been determined via the electrical control module D-100 based on the statistics P.

The directing module B-100 can include a support structure B-400 that supports the visual means B-200 and the audio means B-300. The visual means B-200 can display visual indications B-214 to direct the crowd 100, while the audio means B-300 can announce or diffuse audio indications B-314 to direct the crowd 100. Both the visual indications B-214 and the audio indications B-314 are used to indicate to the crowd 100 the favorable path delimited by the plurality of movable walls C-200.

The visual means B-200 can include a plurality of projectors B-210 configured to project the visual indications B-214 to the crowd 100, and the audio means 9-300 can include a plurality of speakers B-310 configured to diffuse the audio indications B-314 to the crowd 100. Alternatively, the visual means B-200 can include a plurality of screens to display the visual indications B-214 to the crowd 100.

The support structure B-400 can be configured to place the plurality of projectors B-210 and the plurality of speakers B-310 at a predetermined height above the crowd 100 and at a predetermined orientation to have the visual indications B-214 projected on a projection area B-212 well visible by the crowd 100 and the audio indications B-314 well audible by the crowd 100. For example, the support structure B-400 can include a pair of poles B-410 placed on each side of the pair of barriers 500, and a rail B-420 that extends between the pair of poles B-410 and transversally across the directing module B-100. In addition, the rail B-420 can be configured to affix the plurality of projectors B-210 and the plurality of speakers B-310 in a movable way such that the plurality of projectors B-210 and the plurality of speakers B-310 can be moved along a length of the rail B-420 as well as around a longitudinal axis of the rail B-420.

The projection area B-212 can be located to be pertinent and easily visible from the crowd 100. For example, the projection area B-212 can be located on specific part the walking surface 600 of the control system 1000 such as a part between the directing module B-100 and the sorting module C-100 and/or directly on surfaces of the plurality of movable walls C-200 that faces the crowd 100. The projection area B-212 can be large enough to be seen by the crowd 100 approaching the sorting module C-100 and small enough to not completely cover more than two movable walls of the plurality of movable walls C-200. For example, the projection area B-212 can extend greater than a half a width of the movable walls C-200 but smaller than the width of the movable wall C-200.

The visual indications B-214 can include visual symbols indicating to the crowd 100 to follow the favorable path by signaling where the crowd 100 needs to move towards and/or where the crowd 100 needs to move away such as arrows pointing towards the favorable path, crosses indicating a non-favorable path, or any other relevant symbols.

The audio indications B-314 may include audible messages indicating to the crowd 100 to move towards the favorable path, such as human recorded voices or computer generated voices pronouncing the words "move to the center", "move to the left", "move to the right", or "follow the arrows" or any other words of announcement indicating the favorable path to the crowd 100.

Figure 4B:
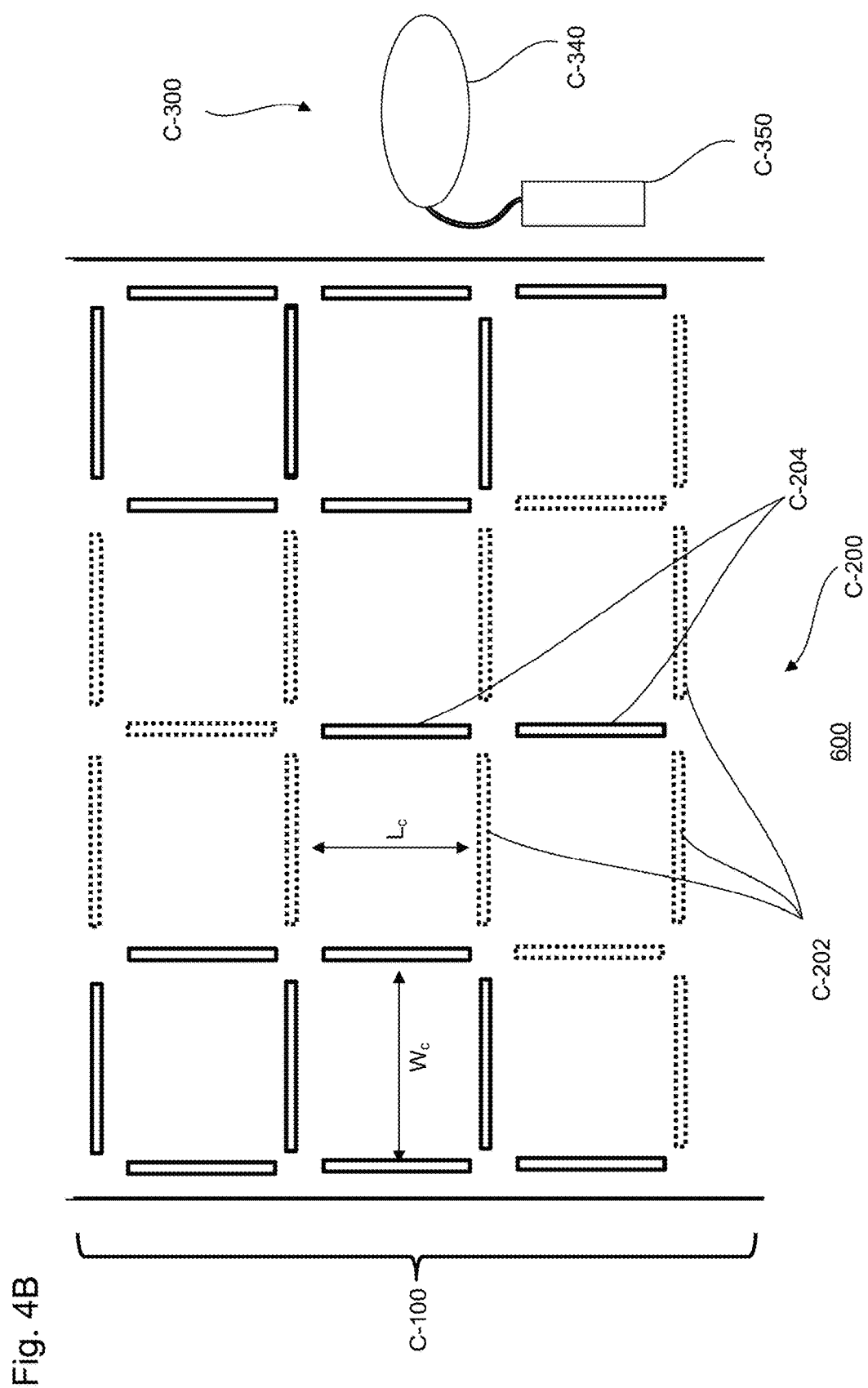
FIG. 4B is a top view of the sorting module of the control system providing a V-shaped path, according to certain aspects of the disclosure.
Figure 4C:
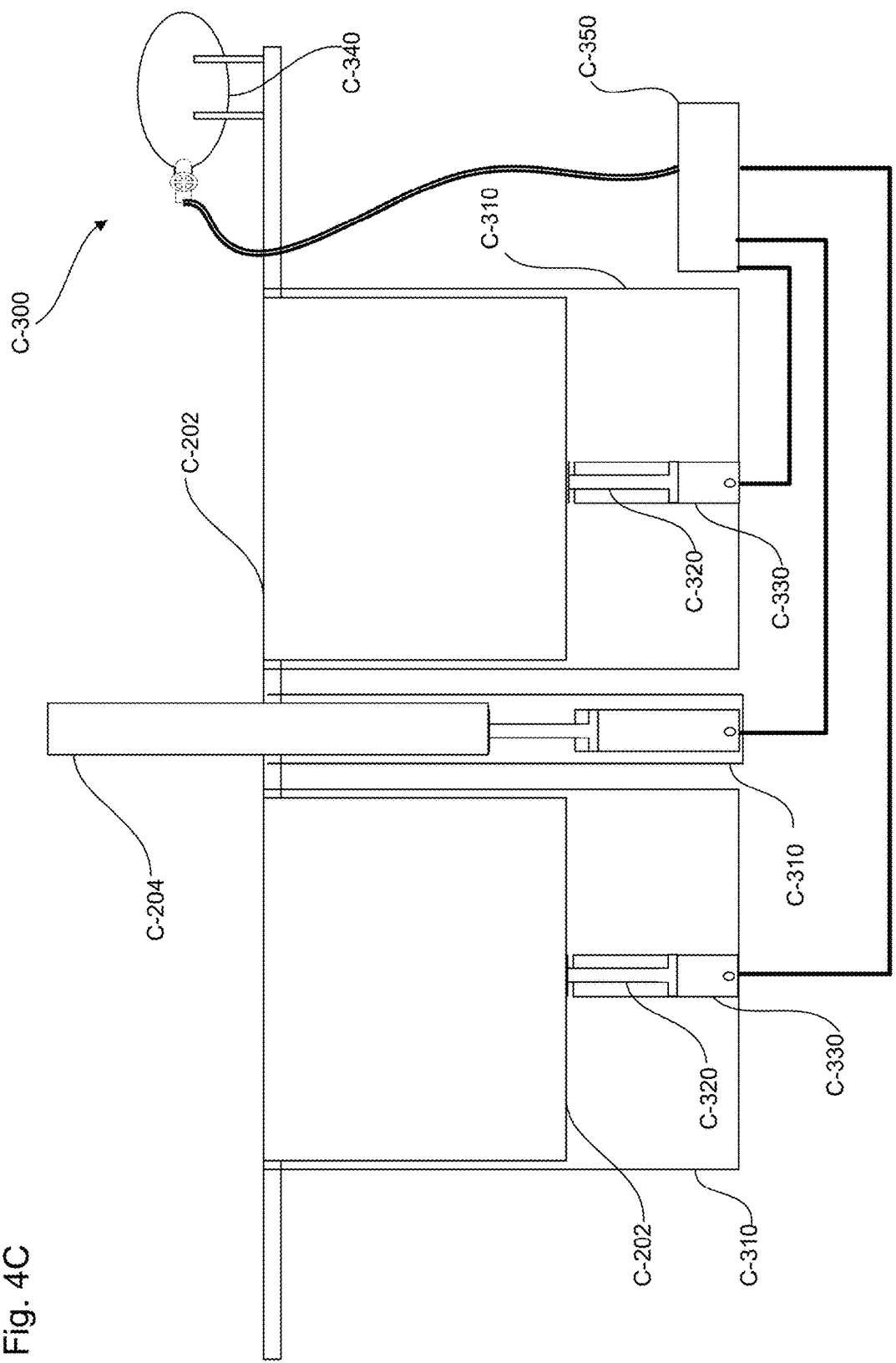
FIG. 4C is a sectional view of the sorting module of the control system, according to certain aspects of the disclosure.

FIGS. 4A-4B are top views of the sorting module C-100 of the control system 1000 providing a straight forward path and a V-shaped path, respectively and according to certain aspects of the disclosure. FIG. 4C is a sectional view of the sorting module C-100 of the control system 1000, according to certain aspects of the disclosure.

The sorting module C-100 is configured to generate the favorable path and force the crowd 100 to follow the favorable path that is determined by the electrical control module D-100 based of the statistics P.

The sorting module C-100 can include the plurality of movable walls C-200 and an articulation mechanism C-300 that independently articulates each movable wall of the plurality of movable walls C-200 from an open position to a closed position and vice-versa. Each movable wall C-200 is articulated by the articulation mechanism C-300 either in the open position or the closed position to provide the favorable path that the crowd 100 follows.

In the open position, the movable wall C-200 is completely retracted in the walking surface 600 to allow the passage of the crowd 100, while in the closed position the movable wall C-200 protrudes from the walking surface 600 to forbid the passage of the crowd 100.

The plurality of movable walls C-200 has a geometrical configuration to provide a plurality of different configurations for the favorable path. The geometrical configuration can be a rectangular grid, wherein four movable walls C-200 forms a cell with a predetermined length cell $L_c$ and a predetermined width cell $W_c$ to only allow a restricted number of subjects 110, e.g. between two and four, to pass through the cell. For example, the predetermined width cell $W_c$ may be between 2 m and 6 m, while the predetermined length cell $L_c$ may be between 1 m and 3 m.

In addition, the rectangular grid configuration enables by articulating each movable wall C-200 independently to generate a large number of different configurations for the favorable path such as L-shaped path, straight forward path, as illustrated in FIG. 4A, C-shaped path, a V-shaped path, as illustrated in FIG. 4B, or the like.

The articulation mechanism C-300 can include a plurality of sleeves C-310 fully and perpendicularly inserted into the walking surface 600 of the control system 1000 to receive and guide the plurality of movable walls C-200. Each sleeve of the plurality of sleeves C-310 can further include a piston C-320 positioned within a cylinder C-330. The piston C-320 can be connected to a bottom part of the movable wall C-100 to rise and to lower the movable wall C-100 along a vertical length of the sleeve C-310.

In the closed position, the piston C-320 is retracted within the cylinder C-330 such that the movable wall C-200 is inserted inside the sleeve C-310 and cannot provide an obstacle for the crowd 100, i.e., allow the passage of the crowd 100. In the open position, the piston C-320 is extended from the cylinder C-330 such that the movable wall C-200 protrudes from the sleeve C-310 and above the walking surface 600 to provide an obstacle to the crowd 100, i.e. forbid the passage of the crowd 100. Specifically, the extension and retraction of the piston C-320 inside the cylinder C-330 can be controlled via a hydraulic fluid that flows in the cylinder C-330 and flows out from the cylinder C-330. The hydraulic fluid may include air, oil, or any fluid capable to withstand a pressure exerted by the movable walls C-200. The hydraulic fluid can be stored and maintained under pressure in a tank C-340.

The distribution of the hydraulic fluid from the tank C-340 to the different cylinders C-330 in order to articulate the plurality of movable walls C-200 and provide the favorable path can be done through a manifold of valves C-350. Opening and closing each valves of the manifold of valves C-350 enables to control the amount of hydraulic fluid transmitted to each cylinder C-330, thereby controlling the articulation of each movable wall C-200. The opening and closing of the valves can be performed via electrical and mechanical valve actuators controlled by the electrical control module D-100.

Alternatively, the articulation mechanism C-300 can rely on an electro-mechanical system. For example, the articulation mechanism C-300 can include an electrical motor, a pinion rotated by the electrical motor, a rack engaged to the pinion and affixed on a side of the movable wall C-200. The rotation of the pinion, via the electrical motor, allows the rack to move up and down from the sleeve C-310 and consequently to articulate the movable wall C-200 from the open position to the closed position and vice-versa. While specific embodiments of the articulation mechanism C-300 have been disclosed herein, it should be noted that these embodiments are not intended to be limiting and alternative mechanism to articulate the movable walls C-200 from the open position to the closed position and vice-versa, such as using additional and/or alternative mechanisms, elements, energy sources, designs or the like, should also be taken into account.

Figure 5:
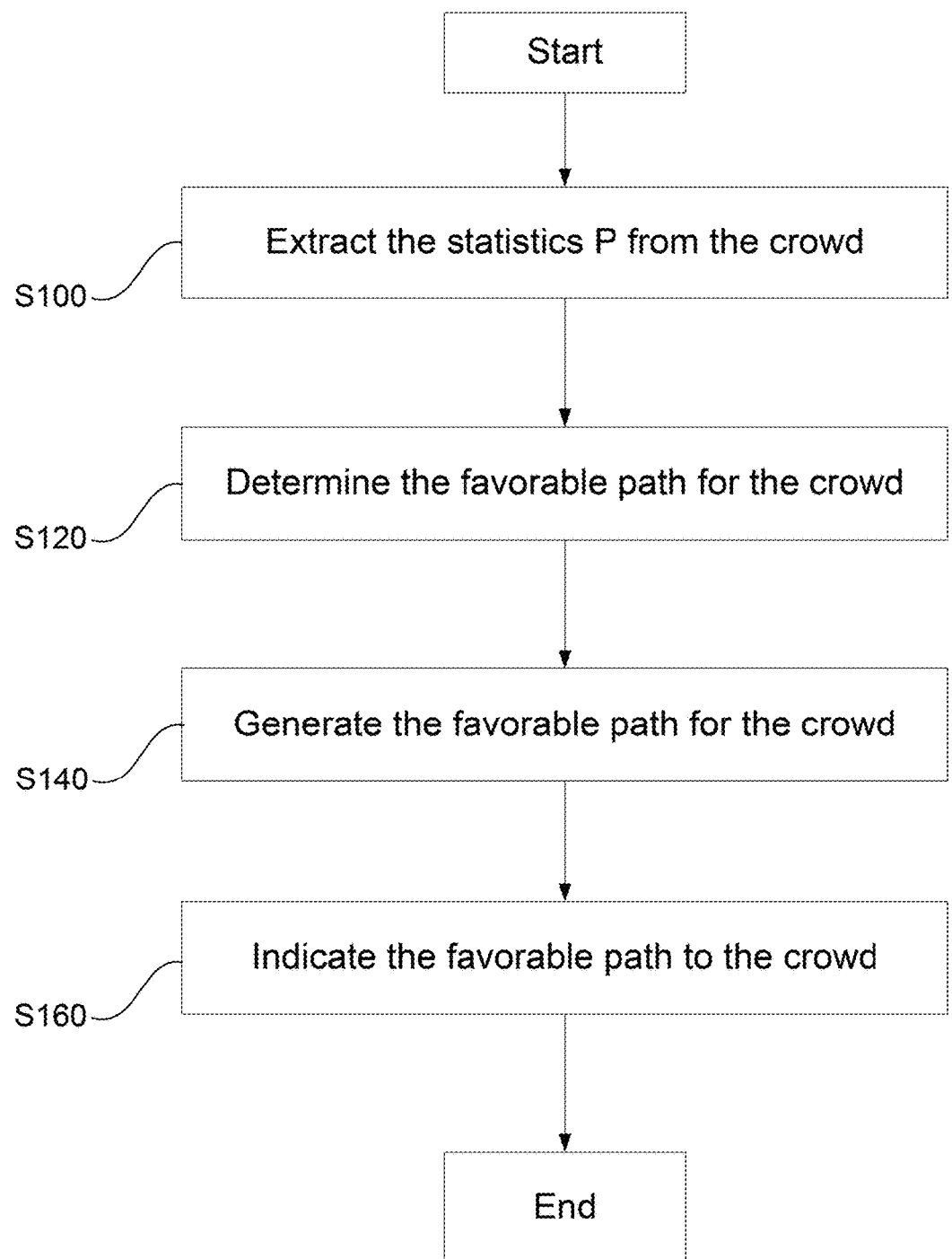
FIG. 5 is a flow chart of a method to guide the crowd, according to certain aspects of the disclosure.

FIG. 5 is a flow chart of a method to guide the crowd 100, according to certain aspects of the disclosure.

In a step S100, the statistics P of the crowd 100 are extracted. The stepping signals S generated by the plurality of detectors A-210 of the detection module A-100 are received and analyzed by the electrical control module D-100 to obtain the statistics P from the crowd 100. The statistics P can be any sort of statistical measurements of the crowd 100 such as the number N of the subjects 110 in the crowd 100, the position $X_i$ of each subject 110 in the crowd 100, the moving speed $V_i$ for each subject 110 in the crowd 100, the moving direction $D_i$ for each subject 110 in the crowd 100, the weight $W_i$ of each subject 110 in the crowd 100, the size $S_i$ of each subject 110 in the crowd.

In a step S120, based on the statistics P extracted in step S100, the electrical control module D-100 determines the favorable path for the crowd 100. The determination of the favorable path can be performed via software instructions performed on the electrical control module D-100.

To determine the favorable path for the crowd 100 through the software instructions, the statistics P can be used to compute global measurements, e.g. medians, modes, deviations, energies, means, or total quantities, and then compare the global measurements to references, e.g., thresholds and/or limit values.

For example, the software instructions can be written to compute a global energy E as the sum of the products between the weight $W_i$ and the square of the moving speed $V_i$ over all the subjects 110 of the crowd 100, e.g., $E=\Sigma_{i=1}^{N} W_i V_i^2$. If the global energy E is above a maximum energy threshold, the favorable path can be the straight forward path, as illustrated in FIG. 4A, to facilitate the circulation of the crowd 100 and avoid agglomeration, while if the global energy E is below a minimum energy threshold, the favorable path can be the V-shaped path, as illustrated in FIG. 4B, to assure a constant flow of subjects 110 through the control system 1000.

In another example, the software instructions can be written to compute a global density D of the crowd 100 as the sum of the products between the position $X_i$ and the size $S_i$ over all the subjects 110 of the crowd 100, e.g., $D=\Sigma_{i=1}^{N} S_i X_i$. If the global density D is above a maximum density threshold, the favorable path can be the straight forward path, as illustrated in FIG. 4A, to facilitate the circulation of the crowd 100 and avoid agglomeration, while if the global density D is below a minimum density threshold, the favorable path can be the V-shaped path, as illustrated in FIG. 4B, to assure a constant flow of subjects 110 through the control system 1000, In another example, the software instructions can be written to compare the number N of the subjects 110 of the crowd 100 to a maximum population threshold and a minimum population threshold. If the number N is above the maximum population threshold, the favorable path can be the straight forward path, as illustrated in FIG. 4A, to facilitate the circulation of the crowd 100 and avoid agglomeration, while if the number N is below the minimum population threshold, the favorable path can be the V-shaped path, as illustrated in FIG. 4B, to assure a constant flow of subjects 110 through the control system 1000.

In step S140, the electrical control module D-100 generates the favorable path by articulating the plurality of movable walls C-200. Specifically, the electrical control module D-100, via software instructions and circuitry, actuates the manifold of valves C-350 of the articulation mechanism C-300 to articulate a first selected group of movable walls C-202 in the open position, see movable walls C-200 represented by solid lines in FIGS. 4A-B, and articulate a second selected group of movable walls C-204 in the closed position, see movable walls C-200 represented by solid lines in FIGS. 4A-B.

In step S160, the electrical control module D-100 indicates to the crowd 100 the favorable path via the visual means B-200 and the audio means B-300. Specifically, the electrical control module D-100, via software instructions and circuitry, actuates the plurality of projectors B-210 of the visual means B-200 to display the visual indications B-214 and actuates the plurality of speakers B-310 of the audio means B-300 to diffuse the audio indications B-314. For example, when the favorable path is the straight forward path, as illustrated in FIG. 4A, the visual indications B-214 can be arrows pointing towards the first selected group of movable walls C-202 and crosses placed in front of the second selected group of movable walls C-204, and the audio indications B-314 can be the words "move straight ahead." In another example, when the favorable path is the V-shaped path, as illustrated in FIG. 4B, the visual indications B-214 can be arrows pointing towards a center line of the sorting module C-100 and the audio indications B-314 can be the words "move towards the center."

Figure 6:
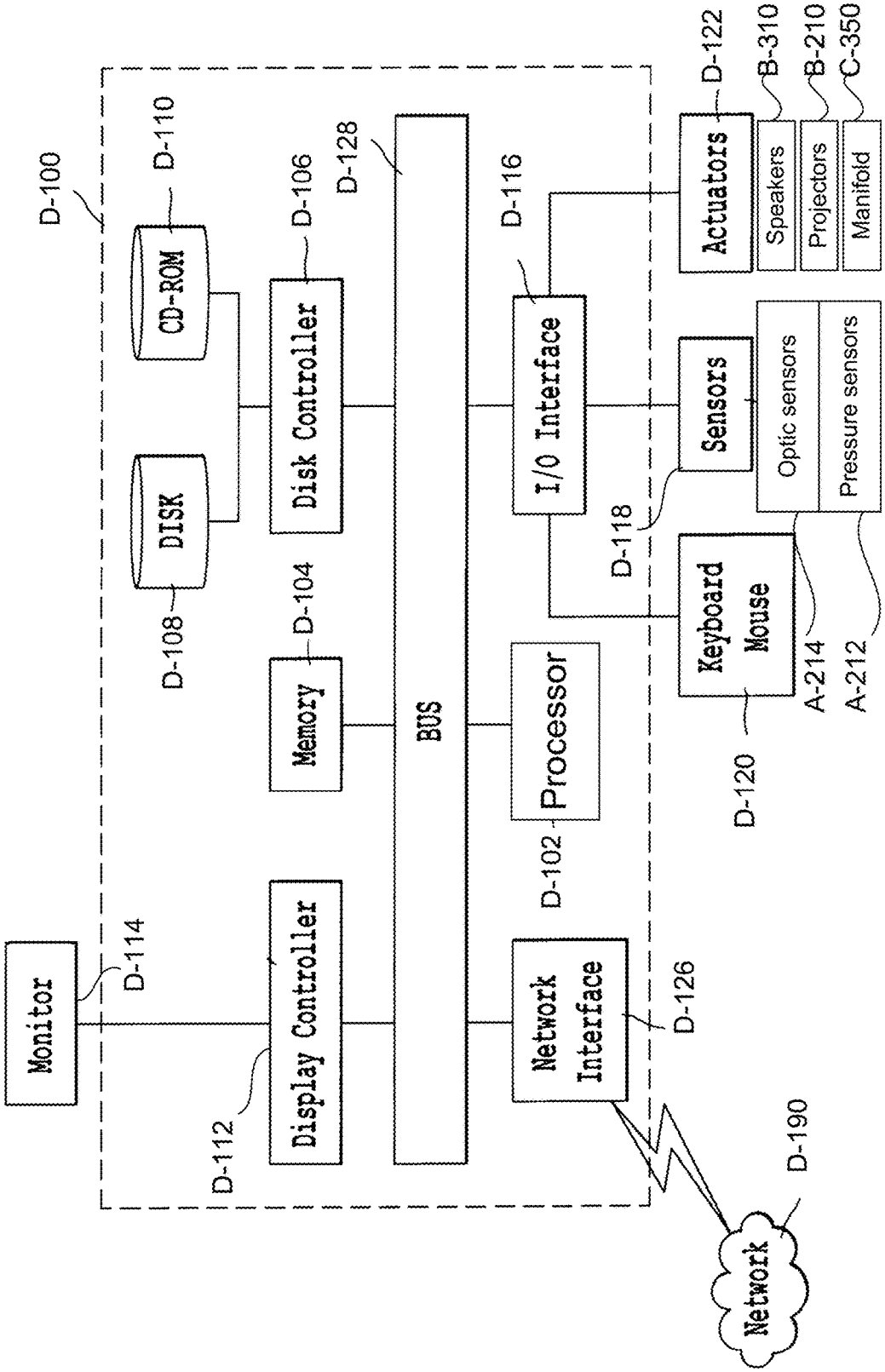
FIG. 6 is a schematic view of a hardware diagram of an electrical control unit for operating the control system, according to certain aspects of the disclosure.

FIG. 6 is a schematic view of a hardware diagram of the electrical control unit D-100 for operating the control system 1000, according to certain aspects of the disclosure.

As shown in FIG. 6, systems, operations, and processes in accordance with this disclosure may be implemented using a processor D-102 or at least one application specific processor (ASP). The processor D-102 may utilize a computer readable storage medium, such as a memory D-104 (e.g., ROM, EPROM, EEPROM, flash memory, static memory, DRAM, SDRAM, and their equivalents), configured to control the processor D-102 to perform and/or control the systems, operations, and processes of this disclosure. Other storage mediums may be controlled via a disk controller D-106, which may control a hard disk drive D-108 or optical disk drive D-110.

The processor D-102 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor D-102 may be a separate device or a single processing mechanism. Further, this disclosure may benefit form parallel processing capabilities of a multi-cored processor.

In another aspect, results of processing in accordance with this disclosure may be displayed via a display controller D-112 to a monitor D-114 that may be peripheral to or part of the electrical control unit D-100. Moreover, the monitor D-114 may be provided with a touch-sensitive interface to a command/instruction interface. The display controller D-112 may also include at least one graphic processing unit for improved computational efficiency. Additionally, the electrical control unit D-100 may include an I/O (input/output) interface D-116, provided for inputting sensor data from sensors D-118 and for outputting orders to actuators D-122. The sensors D-118 and actuators D-122 are illustrative of any of the sensors and actuators described in this disclosure such as the pressure sensors A-212, the optic sensors A-214, the plurality of projectors B-210, the plurality of speakers B-310, or the manifold of valves C-350.

Further, other input devices may be connected to an I/O interlace D-116 as peripherals or as part of the electrical control module D-100. For example, a keyboard or a pointing device such as a mouse D-120 may control parameters of the various processes and algorithms of this disclosure, and may be connected to the I/O interface D-116 to provide additional functionality and configuration options, or to control display characteristics. Actuators D-122 which may be embodied in any of the elements of the apparatuses described in this disclosure may also be connected to the I/O interface D-116.

The above-noted hardware components may be coupled to the network D-124, such as the Internet or a local intranet, via a network interface D-126 for the transmission or reception of data, including controllable parameters to a mobile device. A central BUS D-128 may be provided to connect the above-noted hardware components together, and to provide at least one path for digital communication there between.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A control system to guide a crowd, comprising:
   a detection module to provide stepping signals from the crowd via a plurality of detectors placed on a walking surface of the control system;
   a sorting module to provide a favorable path for the crowd, the sorting module including
      a plurality of movable walls, each movable wall of the plurality of movable walls being independently articulated from an open position to a closed position to provide the favorable path, wherein
      in the open position the movable wall protrudes from the walking surface and in the closed position the movable wall is retracted in the walking surface;
   a directing module to indicate to the crowd the favorable path, the directing module including
      at least one of a plurality of projectors to project visual indications to indicate the favorable path and a plurality of speakers to diffuse audio indications to indicate the favorable path; and
   an electrical control module configured to
      convert the stepping signals into statistics,
      determine the favorable path based on the statistics,
      actuate at least one of the plurality of projectors to project the visual indications and the plurality of speakers to diffuse the audio indications, and
      articulate the plurality of movable walls to force the crowd through the favorable path.

2. The control system of claim 1, wherein the detection module further includes
   a plurality of cylinders with pistons to articulate the plurality of movable walls;
   a tank to contain a hydraulic fluid; and
   a manifold of valves actuated by the electrical control module to transfer the hydraulic fluid from the tank to a first selected group of cylinders and transfer the hydraulic fluid from a second selected group of cylinders to the tank, wherein
      the first selected group of cylinders articulates a first selected group of movable walls in the open position and
      the second selected group of cylinders articulates a second selected group of movable walls in the closed position to provide the favorable path.

3. The control system of claim 2, wherein the sorting module further includes a plurality of sleeves inserted into the walking surface to receive the plurality of movable walls and articulate the plurality of movable walls substantially perpendicularly to the walking surface.

4. The control system of claim 1, wherein the plurality of movable walls has a geometrical configuration that forms a rectangular grid.

5. The control system of claim 4, wherein four movable walls of the plurality of movable walls form a cell with a predetermined length between 2 m and 6 m and a predetermined width between 1 m and 3 m.

6. The control system of claim 1, wherein the statistics include at least one of a number of subjects in the crowd, a position of each subject in the crowd, a moving speed for each subject in the crowd, a moving direction for each subject in the crowd, a weight of each subject in the crowd, a size in each subject of the crowd.

7. The control system of claim 1, wherein the plurality of detectors includes pressure sensors.

8. The control system of claim 1, wherein the plurality of detectors includes optic sensors.

9. The control system of claim 1, wherein the directing module further comprises a support structure to support and place the plurality of projectors and the plurality of speakers above the crowd.

10. The control system of claim 9, wherein the support structure includes a rail placed transversally across the directing module and configured to slidably support the plurality of projectors and the plurality of speakers along a length of the rail.

11. The control system of claim 10, wherein the rail is further configured to rotatably support the plurality of projectors and the plurality of speakers around a longitudinal axis.

12. The control system of claim 1, wherein the visual indications are projected on a projection surface, the projection surface being located on surfaces of the plurality of movable walls articulated in the closed position and facing the crowd.

13. A control system to guide a crowd, comprising:
   a detection module to provide stepping signals from the crowd via a plurality of detectors placed on a walking surface of the control system;
   a sorting module to provide a favorable path for the crowd, the sorting module including
      a plurality of movable walls, each movable wall of the plurality of movable walls being independently articulated from an open position to a closed position to provide the favorable path, wherein
      in the open position the movable wall protrudes from the walking surface and in the closed position the movable wall is retracted in the walking surface; and
   an electrical control module configured to
      convert the stepping signals into statistics, determine the favorable path based on the statistics, and articulate the plurality of movable walls to force the crowd through the favorable path.

14. The control system of claim 12, wherein the detection module further includes
   a plurality of cylinders with pistons to articulate the plurality of movable walls;
   a tank to contain a hydraulic fluid; and
   a manifold of valves actuated by the electrical control module to transfer the hydraulic fluid from the tank to a first selected group of cylinders and transfer the hydraulic fluid from a second selected group of cylinders, wherein
      the first selected group of cylinders articulates a first selected group of movable walls in the open position and
      the second selected group of cylinders articulates a second selected group of movable walls in the closed position.

15. The control system of claim 14, wherein the sorting module further includes a plurality of sleeves inserted into the walking surface to receive the plurality of movable walls and configured to articulate the plurality of movable walls substantially perpendicularly to the walking surface.

16. The control system of claim 12, wherein the plurality of movable walls has a geometrical configuration forming a rectangular grid.

17. The control system of claim 16, wherein four movable walls of the plurality of movable walls form a cell with a predetermined length between 2 m and 6 m and a predetermined width between 1 m and 3 m.

18. A method to guide a crowd, the method comprising:
   providing a detection module with a plurality of detectors placed on a walking surface;
   providing a sorting module with a plurality of movable walls, each movable wall of the plurality of movable walls being independently articulated from an open position to a closed position, wherein
      in the open position the movable wall protrudes from the walking surface, and
      in the closed position the movable wall is retracted in the walking surface;
   providing a directing module with at least one of a plurality of projectors and a plurality of speakers;
   extracting, via the plurality of detectors, stepping signals from the crowd;
   converting, via software instruction performed on an electrical control module, the stepping signals into statistics;
   determining, via software instruction performed on the electrical control module, a favorable path for the crowd based on the statistics;
   actuating, via software instructions performed on the electrical control module, the plurality of projectors to project visual indications for the favorable path;
   actuating, via software instructions performed on the electrical control module, the plurality of speakers to diffuse audio indications for the favorable path;
   articulating, via software instructions performed on the electrical control module, the plurality of movable walls to guide the crowd through the favorable path.

19. The method of claim 18, wherein the statistics include at least one of a density of the crowd, a position of each subject of the crowd, a moving speed of the crowd, and a moving direction of the crowd.

20. The method of claim 19, wherein determining the favorable path includes
   comparing, via software instructions performed on the electrical control module, the density of the crowd with a predetermined maximum density threshold and a minimum predetermined threshold.

* * * * *